(12) United States Patent
Wang et al.

(10) Patent No.: US 7,341,533 B2
(45) Date of Patent: Mar. 11, 2008

(54) CVT HOUSING HAVING WEAR-RESISTANT BORE

(75) Inventors: Yucong Wang, West Bloomfield, MI (US); Sime Stavreski, Canton, MI (US); Jasbir Singh, Canton, MI (US)

(73) Assignee: General Motors Corporation, Detroit, MI (US)

( * ) Notice: Subject to any disclaimer, the term of this patent is extended or adjusted under 35 U.S.C. 154(b) by 649 days.

(21) Appl. No.: 10/693,186

(22) Filed: Oct. 24, 2003

(65) Prior Publication Data

US 2005/0089712 A1   Apr. 28, 2005

(51) Int. Cl.
*F16H 57/00* (2006.01)
*C23C 4/08* (2006.01)
*C23C 4/12* (2006.01)

(52) U.S. Cl. ............ 474/144; 35/8; 74/606 R; 427/455; 427/449; 427/451

(58) Field of Classification Search .......... 474/8, 474/18, 28, 46; 384/471, 463, 569, 907; 419/193 A, 241 R, 248; 29/888.09; 427/446, 427/455, 453, 463; 477/45
See application file for complete search history.

(56) References Cited

U.S. PATENT DOCUMENTS

| | | | |
|---|---|---|---|
| 3,935,752 A * | 2/1976 | Kelbel et al. ............ 74/473.1 |
| 4,103,566 A * | 8/1978 | VON Kaler et al. ........ 475/206 |
| 4,898,040 A * | 2/1990 | Tamba et al. ............. 74/606 R |
| 5,080,056 A | 1/1992 | Kramer et al. ........ 123/193 CP |
| 5,271,967 A * | 12/1993 | Kramer et al. .............. 427/455 |
| 5,326,645 A * | 7/1994 | Ashary et al. .............. 428/552 |
| 5,622,753 A * | 4/1997 | Shepley et al. ............. 427/453 |
| 5,714,205 A * | 2/1998 | Marantz et al. ............ 427/449 |
| 6,089,999 A * | 7/2000 | Imaida et al. ................. 474/18 |
| 6,258,416 B1 * | 7/2001 | Seitz ......................... 427/449 |
| 6,367,151 B1 * | 4/2002 | Schlegel et al. ......... 29/888.09 |
| 6,435,830 B1 * | 8/2002 | Allen et al. ............. 416/193 A |
| 6,610,369 B2 | 8/2003 | Byrnes et al. .............. 427/449 |
| 2002/0019280 A1* | 2/2002 | Brown ........................ 474/35 |
| 2002/0043128 A1* | 4/2002 | Cooper ..................... 74/606 R |
| 2003/0008737 A1* | 1/2003 | Illerhaus et al. ............. 474/18 |
| 2004/0248678 A1* | 12/2004 | Kapaan et al. ................. 474/8 |

FOREIGN PATENT DOCUMENTS

| | | | | |
|---|---|---|---|---|
| DE | 3810448 A1 * | 10/1988 | ............... 384/471 |
| EP | 0637695 A1 * | 2/1995 | ............... 384/463 |
| EP | 1209246 A1 * | 5/2002 | |
| EP | 1281786 A1 * | 2/2003 | |
| JP | 2000-271729 A * | 10/2000 | |
| JP | 2003-254412 A * | 9/2003 | |
| NL | KR 2005-065911 A * | 6/2005 | |

\* cited by examiner

*Primary Examiner*—Marcus Charles

(57) ABSTRACT

A continuously variable transmission (CVT) includes an aluminum housing member having a bore formed therein. A rotatable pulley member is supported on a bearing within the bore. The bore includes a layer of thermal spray coating for improved wear resistance so that the bore supports the bearing without a steel sleeve therebetween.

14 Claims, 2 Drawing Sheets

CVT HOUSING HAVING WEAR-RESISTANT BORE

TECHNICAL FIELD

The present invention relates to a continuously variable transmission (CVT) housing having a bore configured to directly support pulley bearings, wherein the bore has a thermal spray coating to improve wear resistance.

BACKGROUND OF THE INVENTION

Continuously variable transmissions (CVT) of the variable pulley or sheave type employ pulley assemblies having at least one member that is moveable to control the diameter at which a flexible transmitter, such as a belt or chain, operates. The transmission has an input pulley and an output pulley, both of which have an adjustable member. The transmission ratio between the input and the output pulleys varies between an underdrive ratio and an overdrive ratio.

The CVT ratio is continuously variable between the extremes of the underdrive and overdrive ratios. During the underdrive ratios, the flexible transmitter is positioned at a small diameter on the input pulley and a large diameter on the output pulley. Thus, the input pulley has more than one revolution for each revolution of the output pulley. As the diameter of the input pulley increases, the diameter of the output pulley decreases until a 1:1 ratio exists across the pulleys. During the overdrive ratios, the diameter of the input pulley is maintained larger than the diameter of the output pulley. Thus, each revolution of the input pulley results in more than one revolution of the output pulley.

To accommodate the ratio variance, at least one member of each of pulley is disposed to slide axially relative to the other member of the pulley. This movement is typically controlled hydraulically.

CVTs have become increasingly popular in recent years because they may provide improved fuel economy, the ability to operate the engine at lower rpms over a wider range of the fuel economy schedule, smoother shifting (ratioing), more efficient vehicle front end packaging, as well as manual transmission interchangeability and all-wheel drive compatibility.

In current CVT designs, the rotatable pulley members are supported on bearings, and the bearings rotate within steel sleeves which are pressed into a bore in the case or cover. These steel sleeves are required in order to reduce the wear between the bearings and the aluminum case or cover. Accordingly, the steel sleeves add a component cost and additional assembly costs because the sleeves must be pressed into the bores. Further, the steel sleeves have a wall thickness of about 1.5 mm. As a result of packaging constraints, the CVT is designed to be as small as possible so that the 1.5 mm thickness of the steel sleeves limits the bearing outside diameter by 3 mm.

SUMMARY OF THE INVENTION

The present invention eliminates the above-described steel sleeves on aluminum CVT covers and cases for bearings by providing the bore in the aluminum cover or case with a thermal spray coating to improve the wear resistance or durability of the bore in the aluminum case or cover.

More specifically, the invention provides a continuously variable transmission (CVT) including an aluminum housing member having a bore formed therein. A rotatable pulley member is supported on a bearing within the bore. The bore includes a layer of thermal spray coating so that the bore supports the bearing without a steel sleeve therebetween.

In one embodiment, the thermal spray coating is a steel alloy including 0.1 to 1% weight C, 0 to 14% weight Cr, 0 to 2% weight Mn, 0 to 2% weight Ni, 0 to 1% weight Si, and the balance Fe.

In another embodiment, the thermal spray coating is a nickel alloy including 15 to 25% weight Cr, 0 to 20% weight Al, 0 to 5% weight Y, and the balance Ni.

In a further embodiment, the thermal spray coating is a copper alloy including 7 to 13% weight Al, 0 to 5% weight Fe, 0 to 6% weight Ni.

The thermal spray coating may be applied by a two wire arc spray process or a plasma thermal spray coating process.

The aluminum housing member may be a transmission case or a cover.

Another aspect of the invention provides a method of manufacturing a continuously variable transmission (CVT) including the steps of:

a. casting an aluminum housing member with a bore formed therein;

b. providing a thermal spray coating on the I.D. surface of the bore; and c. positioning a bearing directly against the I.D. surface of the bore for supporting a rotatable pulley member without a sleeve positioned between the bearing and the I.D. surface.

Prior to the thermal spray coating application, the I.D. surface of the bore may be cleaned, degreased, and grit blasted. After the thermal spray coating is applied, the I.D. surface may be finish machined. If the thermal spray coating is applied by wire arc spray, then the finished machining process may include grinding. If the thermal spray coating is applied by a plasma spray process, then the finish machining may including buffering.

It should be noted that these coatings could be used in other non-CVT front wheel drive or rear wheel drive transmission applications.

The above features and advantages, and other features and advantages, of the present invention are readily apparent from the following detailed description of the best modes for carrying out the invention when taken in connection with the accompanying drawings.

DESCRIPTION OF THE PREFERRED EMBODIMENTS

Figure 1:
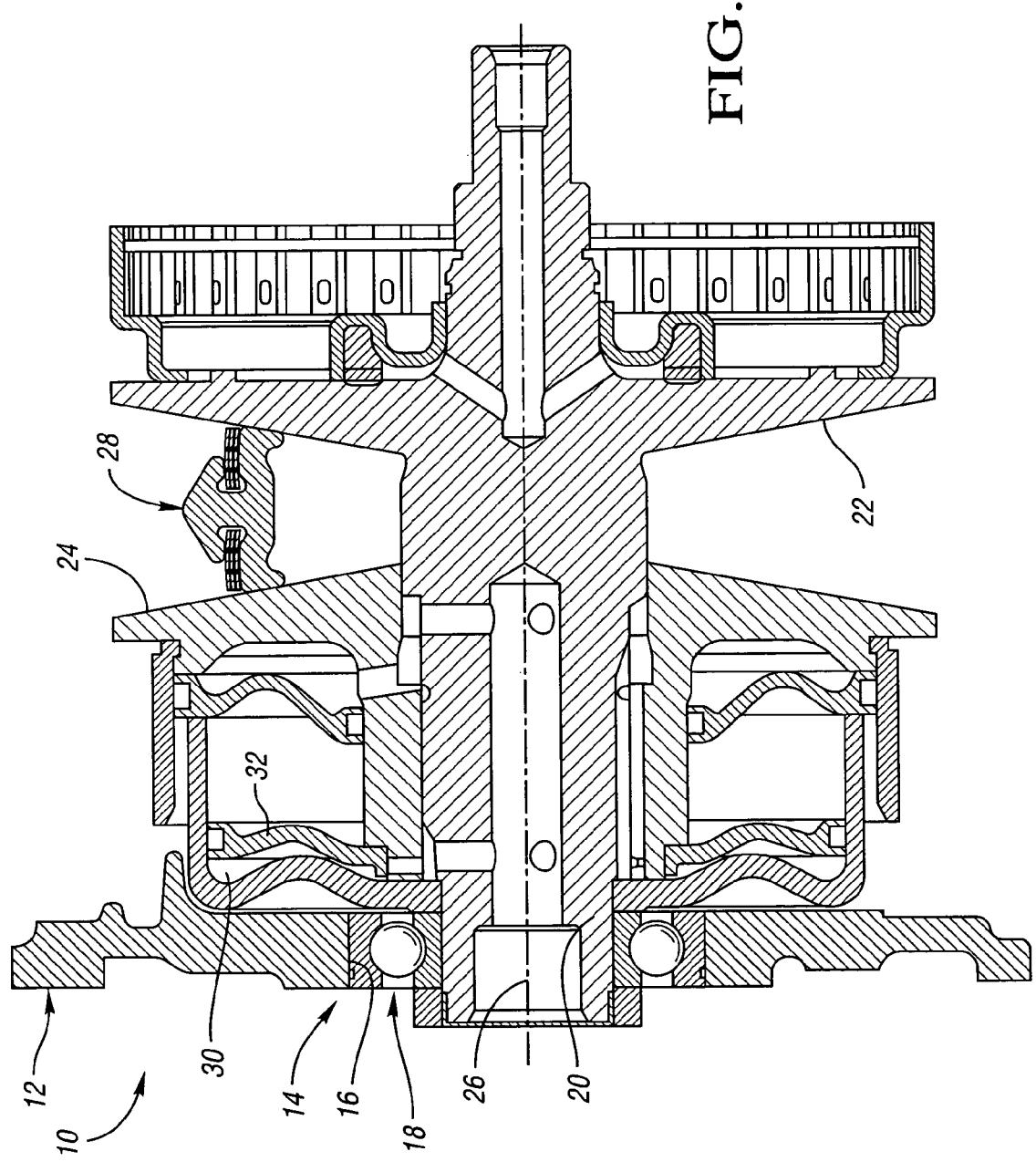
FIG. 1 is a partial cross-sectional view of a CVT including a housing member and rotatable pulley.

Referring to FIG. 1, a partial cross-sectional view of a continuously variable transmission (CVT) 10 is shown. The CVT 10 includes an aluminum housing member 12, which may be a transmission case or cover. The aluminum housing member 12 has a bore 14 formed therein with an I.D. surface 16. A bearing 18 is supported directly against the I.D. surface 16 of the bore 14. The bearing 18 rotatably supports a pulley member 20. The pulley member 20 is integral with the first pulley half 22. The second pulley half 24 is movable in the direction of the axis 26 toward the first pulley half 22 for adjusting the radial position of the belt 28 with respect to the axis 26. The second pulley half 24 is moveable toward the first pulley half 22 when pressurized fluid is provided in the apply chamber 30 which causes movement of the piston 32 and second pulley half 24 toward the first pulley half 22.

The invention is particularly characterized by a layer of thermal spray coating which is applied onto the I.D. surface 16 of the bore 14 to substantially improve wear resistance of the bore 14 so that no steel sleeve is needed between the bearing 18 and the I.D. surface 16.

In one embodiment, the thermal spray coating is a steel alloy, containing 0.1 to 1% weight C, 0 to 14% weight Cr, 0 to 2% Mn, 0 to 2% weight Ni, 0 to 1% weight Si, and the balance Fe.

In another embodiment, the thermal spray coating is a nickel alloy, containing 15 to 25% weight Cr, 0 to 20% weight Al, 0 to 5% Y, and the balance Ni.

In a further embodiment, the thermal spray coating is a copper alloy including 7 to 13% weight Al, 0 to 5% weight Fe, 0 to 6% weight Ni. This type of material may provide better wear resistance than the nickel alloy coating. It may be applied over, or replace, the nickel alloy coating. Some copper alloy coating examples are: (1) 12% Al, 4% Fe, and balance Cu; (2) 9% Al, 1% Fe, and balance Cu; and (3) 8% Al, 4-5% Ni, and balance Cu.

The nickel alloy coating is much thinner than the steel alloy coating since the nickel coating exhibits much better bonding to the aluminum substrate. As a result of the lesser bonding, a thicker coating of steel alloy is required to enhance strength of the coated layer. This thicker coating results in a rough coating surface finish, which may require machining to smooth the surface, if desired. The steel coating discussed herein requires such machining for a smooth surface.

The thermal spray coating may be applied by either two wire arc or plasma thermal spray. The wire arc spray process or plasma thermal spray process may be used for the steel coatings. However, only the plasma thermal spray coating process may be used for the nickel alloy coating.

A method in accordance with the invention may include the following steps: (A) An aluminum housing member is cast with a bore formed therein. (B) The rough machined bore is cleaned and degreased to eliminate contamination, including rust, oils, grease, paint, etc. (C) The periphery of the bore is masked for grit blasting and coating to prevent damage from grit blasting or deposition of coating on adjacent areas. (D) The bore is grit blasted with alumina powder to create a rough surface texture that promotes bonding of the sprayed coating. A high pressure water jet blast could alternatively be used to replace the grit blasting for improved bonding and alumina powder (contamination) free operation. (E) Coating deposition is conducted with a spray head which moves robotically along the central axis of the bore 14. If the wire arc spray process is used, the parts are preheated to 125° F. to 150° F. before coating to improve the bonding between the coating and the substrate due to a resulting reduction in thermal shrinkage difference. The steel alloy coating is used with the wire arc spray process. The steel coating thickness is in the range of 0.1 to 0.5 mm after post machining (with a typical thickness of 0.2 mm). Using the plasma spray process, the nickel alloy coating has a thickness of 0.02 to 0.08 mm (with a typical thickness of 0.05 mm). The substrate (aluminum housing) is not preheated. Also, the steel coating may alternatively be applied with the plasma spray process. (F) The masking is then removed. (G) If a steel coating has been applied, then post-coating grinding is used to smooth the I.D. surface. Buffering may also be used to smooth the surface. If the surface is a thin nickel coating, then buffering only may be used. This post-machining operation is desired to achieve the diameter tolerance and surface roughness parameter requirements. (H) In-process and final inspection are then performed.

Figure 2:
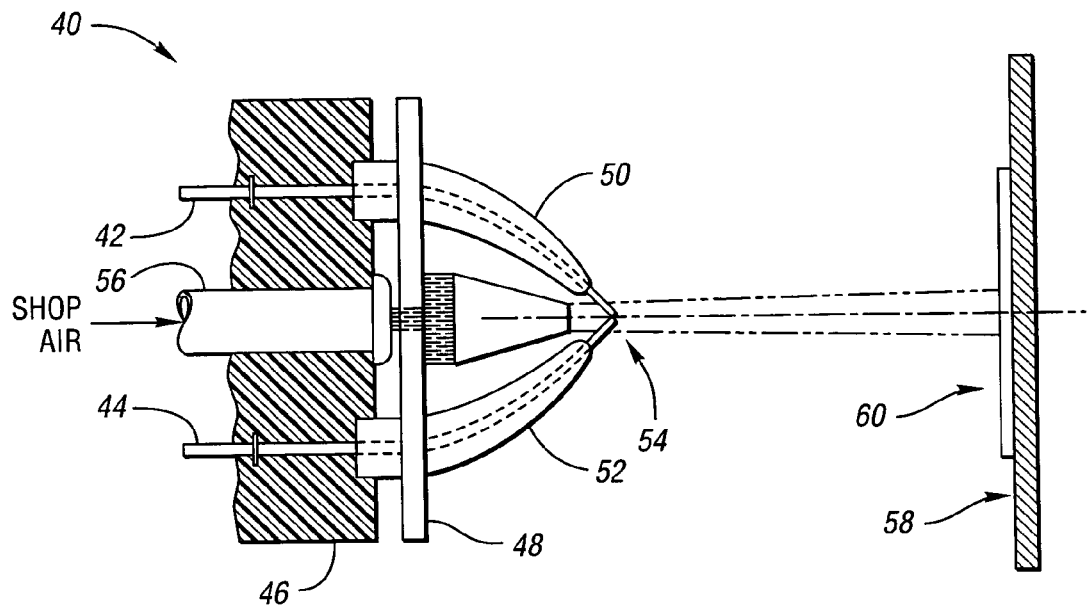
FIG. 2 is a schematic illustration of an electric arc spray device for use with the present invention.

Referring to FIG. 2, an electric arc spray apparatus 40 is schematically illustrated. As shown, steel alloy wires 42, 44 are fed through an insulated housing 46, through a reflector plate 48, and are guided to an arc point 54 by wire guides 50, 52. A shop air tube 56 propels a stream of compressed air or other gas into the arc point area 54. Heating and melting occur when the two electrically opposed charged wires 42, 44, comprising the spray material, are fed together in such a manner that a controlled arc occurs at the arc area 54. The molten metal on the wire tips is atomized and propelled onto the prepared substrate 58 by the stream of compressed air from the tube 56 to form the thermal spray coating layer 60. The wires 42, 44 are about 1.5 to 3 mm in diameter. This process is feasible for high volume, low cost applications. It requires no expensive gas, such as argon.

Figure 3:
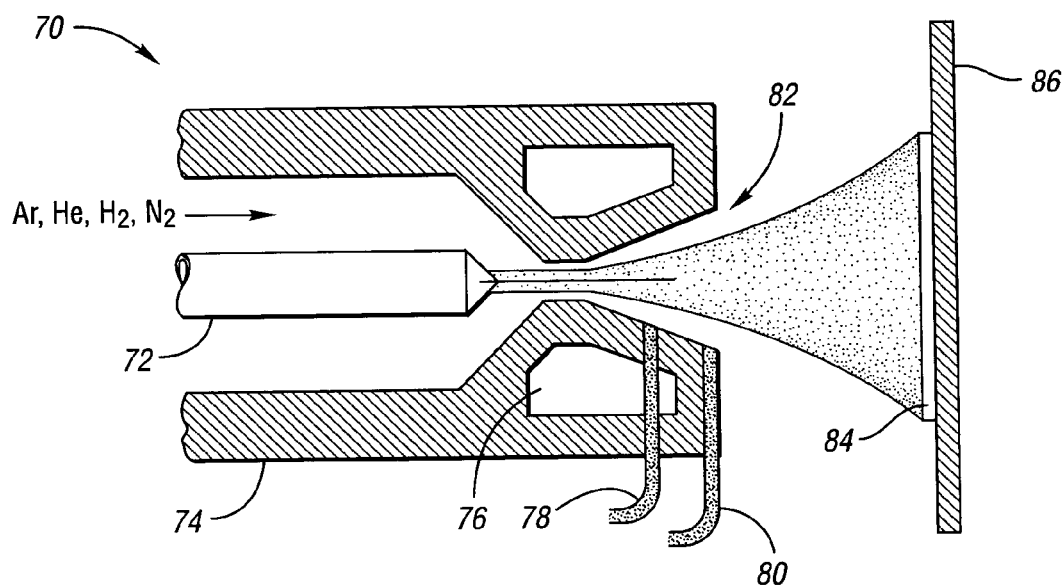
FIG. 3 is a schematic illustration of a plasma spray process for use with the present invention.

Referring to FIG. 3, a schematic illustration of a plasma thermal spray coating device 70 is shown. As illustrated, a gas, such as argon, is allowed to flow between a tungsten cathode 72 and a copper anode 74, which is cooled by water 76. The coating powder, such as nickel alloy, is fed through the tubes 78, 80 into the nozzle discharge area 82. An electric arc is initiated between the two electrodes using a high frequency discharge, and then sustained using DC power. The arc ionizes the gas, creating a high pressure gas plasma with extremely high temperature. Power levels in this type of plasma spray torch are usually in the range of 30 to 80 kW. The coating powder is introduced into the gas stream either just outside the torch or in the diverging exit region 82 of the nozzle. It is both heated and accelerated by the high temperature, high velocity plasma gas stream. A resulting coating layer 84 is thereby applied to the substrate 86. To achieve dense coating and good bonding to the substrate, the powder velocities should be in the range of 300 to 550 m/s and the powder temperatures should be at or slightly above the coating material melting point.

Another option for applying the thermal spray coating would be high velocity oxygen fuel (HVOF) thermal spray process. This process may be used for low-carbon steel coatings and copper alloy coatings.

Further details regarding thermal spray coating processes may be found in U.S. Pat. Nos. 5,080,056; 5,271,967; and 6,610,369, assigned to the assignee of the present application, each of which is hereby incorporated by reference in its entirety.

It should be noted that these coatings could be used in other non-CVT transmission applications.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
   an aluminum housing member having a bore formed therein;
   a rotatable member supported on a bearing within the bore; and
   wherein said bore includes a layer of thermal spray coating for improved wear resistance so that the bore supports the bearing without a steel sleeve therebetween; and
   wherein said thermal spray coating comprises a steel alloy having 0.1 to 1% weight C, 0 to 14% weight Cr, 0 to 2% weight Mn, 0 to 2% weight Ni, 0 to 1% weight Si, and the balance Fe.

2. The transmission of claim 1, wherein said steel alloy has a coating thickness between approximately 0.1 and 0.5 mm.

3. The transmission of claim 1, wherein said thermal spray coating is applied by a two wire arc spray process.

4. The transmission of claim 1, wherein said thermal spray coating is applied by a plasma thermal spray coating process.

5. The transmission of claim 1, wherein said transmission is a continuously variable transmission (CVT), said rotatable member is a rotatable pulley member, and said aluminum housing member comprises a transmission case.

6. The transmission of claim 1, wherein said transmission is a continuously variable transmission (CVT), said rotatable member is a rotatable pulley member, and said aluminum housing member comprises a transmission cover.

7. A transmission comprising:
an aluminum housing member having a bore formed therein; and
a rotatable member supported on a bearing within the bore;
wherein said bore includes a layer of thermal spray coating for improved wear resistance so that the bore supports the bearing without a steel sleeve therebetween; and
wherein said thermal spray coating comprises a nickel alloy having 15 to 25% weight Cr, 0 to 20% weight Al, 0 to 5% Y, and the balance Ni.

8. The transmission of claim 7, wherein said nickel alloy has a coating thickness between approximately 0.02 and 0.08 mm.

9. A transmission comprising:
an aluminum housing member having a bore formed therein; and
a rotatable member supported on a bearing within the bore;
wherein said bore includes a layer of thermal spray coating for improved wear resistance so that the bore supports the bearing without a steel sleeve therebetween; and
wherein said thermal spray coating comprises a copper alloy, having 7 to 13% weight Al, 0 to 5% weight Fe, 0 to 6% Ni, and the balance Cu.

10. A continuously variable transmission (CVT) comprising:
an aluminum housing member having a bore formed therein;
a rotatable pulley member supported on a bearing within the bore;
wherein said bore includes a layer of thermal spray coating for improved wear resistance so that the bore supports the bearing without a steel sleeve therebetween; and
wherein said thermal spray coating comprises a steel alloy, having 0.1 to 1% weight C, 0 to 14% weight Cr, 0 to 2% weight Mn, 0 to 2% weight Ni, 0 to 1% weight Si, and the balance Fe.

11. The CVT of claim 10, wherein said thermal spray coating is applied by a two wire arc spray process.

12. The CVT of claim 10, wherein said thermal spray coating is applied by a plasma thermal spray coating process.

13. The CVT of claim 10, wherein said aluminum housing member comprises a transmission case.

14. The CVT of claim 10, wherein said aluminum housing member comprises a transmission cover.

* * * * *